(12) United States Patent
Chen

(10) Patent No.: US 8,588,194 B2
(45) Date of Patent: Nov. 19, 2013

(54) METHOD, APPARATUS, AND SYSTEM FOR MANAGING MOBILE COMMUNICATION DEVICES

(75) Inventor: Shuhua Chen, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 488 days.

(21) Appl. No.: 12/832,135

(22) Filed: Jul. 8, 2010

(65) Prior Publication Data

US 2010/0272057 A1 Oct. 28, 2010

Related U.S. Application Data

(63) Continuation of application No. PCT/CN2009/071519, filed on Apr. 28, 2009.

(30) Foreign Application Priority Data

Apr. 30, 2008 (CN) .......................... 2008 1 0094990

(51) Int. Cl.
 *H04W 4/00* (2009.01)
(52) U.S. Cl.
 USPC .......................................... 370/338; 370/401
(58) Field of Classification Search
 None
 See application file for complete search history.

(56) References Cited

U.S. PATENT DOCUMENTS

| | | | |
|---|---|---|---|
| 8,103,744 B2* | 1/2012 | Yoshihara et al. ............. | 709/219 |
| 8,125,894 B2* | 2/2012 | Van Den Bosch et al. ... | 370/219 |
| 8,233,486 B2* | 7/2012 | Phuah et al. ................ | 370/395.2 |
| 2006/0120305 A1* | 6/2006 | Van Den Bosch et al. ... | 370/254 |
| 2007/0025341 A1* | 2/2007 | Baigal et al. ................. | 370/352 |
| 2007/0201508 A1* | 8/2007 | Blackford et al. ............ | 370/466 |
| 2007/0249323 A1 | 10/2007 | Lee et al. | |
| 2008/0010358 A1 | 1/2008 | Jin | |
| 2008/0117902 A1* | 5/2008 | Vinneras ....................... | 370/389 |
| 2008/0137673 A1* | 6/2008 | Phuah et al. .................. | 370/401 |
| 2008/0215668 A1* | 9/2008 | Hu ................................. | 709/202 |
| 2008/0232336 A1* | 9/2008 | Elkady et al. ................ | 370/338 |

(Continued)

FOREIGN PATENT DOCUMENTS

| CN | 1848760 A | 10/2006 |
|---|---|---|
| CN | 1859160 A | 11/2006 |

(Continued)

OTHER PUBLICATIONS

International Search Report from P.R. China in International Application No. PCT/CN2009/071519 mailed Jul. 23, 2009.

(Continued)

*Primary Examiner* — Phirin Sam
(74) *Attorney, Agent, or Firm* — Conley Rose, P.C.; Grant Rodolph; Nicholas K. Beaulieu

(57) ABSTRACT

A method for managing mobile communications devices includes: receiving a management instruction delivered by an ACS through a TR069 protocol; converting the management instruction into a command identifiable to a mobile communications device, and sending the identifiable command to the mobile communications device; receiving a response instruction sent by the mobile communications device after the mobile communications device executes the identifiable command; and encapsulating the response instruction into a TR069 response message, and sending the message to the ACS. Through the method and apparatus for managing mobile communications devices, a management instruction is converted into a command identifiable to the mobile communications device; the mobile communications device executes the relevant operations according to the instruction and implements the relevant services, thus implementing unified management for mobile communications devices.

20 Claims, 3 Drawing Sheets

(56) References Cited

U.S. PATENT DOCUMENTS

| | | | |
|---|---|---|---|
| 2009/0064268 A1* | 3/2009 | Straub et al. | 725/152 |
| 2009/0086688 A1* | 4/2009 | Kvache et al. | 370/338 |
| 2009/0156213 A1* | 6/2009 | Spinelli et al. | 455/436 |

FOREIGN PATENT DOCUMENTS

| | | |
|---|---|---|
| CN | 101087460 A | 12/2007 |
| CN | 101572617 B | 11/2011 |
| KR | 10-2009-0023971 | 3/2009 |
| WO | WO-2007/014369 A2 | 2/2007 |

OTHER PUBLICATIONS

Supplemental European Search Report dated (mailed) Oct. 20, 2010, issued in related Application No. 09737687.5-2416, PCT/CN2009/071519, filed Apr. 28, 2009, Huawei Technologies Co., Ltd.

Written Opinion of the International Searching Authority (translation) dated (mailed) Nov. 27, 2008, issued in related Application No. PCT/CN2008/071988, filed Aug. 14, 2008, Huawei Technologies Co., Ltd.

Husain, Syed et al., "Remote Device Management of WiMAX Devices in Multi-Mode Multi-Access Environment", Broadband Multimedia Systems and Broadcasting, 2008 IEEE International Symposium, Mar. 31, 2008-Apr. 2, 2008, 13 pgs.

First Chinese Office Action dated (mailed) Nov. 4, 2009, issued in related Chinese Application No. 200810094990.4, Huawei Tech Co. Ltd.

Second Chinese Office Action dated (mailed) Apr. 25, 2011, issued in related Chinese Application No. 200810094990.4, Huawei Tech Co. Ltd.

Communication from a foreign counterpart application, European Application No. 09737687.5, Office Action dated Oct. 8, 2012, 5 pages.

* cited by examiner

METHOD, APPARATUS, AND SYSTEM FOR MANAGING MOBILE COMMUNICATION DEVICES

CROSS-REFERENCE TO RELATED APPLICATIONS

This application is a continuation of International Application No. PCT/CN2009/071519, filed on Apr. 28 2009, which claims priority to Chinese Patent Application No. 200810094990.4, filed on Apr. 30, 2008, both of which are hereby incorporated by reference in their entireties.

FIELD OF THE INVENTION

The present invention relates to communication technologies, and in particular, to a method, an apparatus, and a system for managing mobile communication devices.

BACKGROUND

With the rapid convergence of the fixed network and the mobile network, many Fixed Mobile Convergence (FMC) Internet gateway products which integrate the Home Gateway (HGW) and the Mobile Station (MS) have emerged. Using an Automatic Configuration Server (ACS) network management platform to manage the mobile communication devices in the FMC product is a uniform requirement for equipment operation and service implementation.

The Digital Subscriber Loop (DSL) Forum releases a Consumer Premises Equipment (CPE) WAN Management Protocol (CWMP), namely, 069(TR069), which defines the mode of managing CPEs. The corresponding 098(TR098) protocol and TR098 Amendment 1 formulate an Internet gateway data model, and define profiles such as Baseline. Moreover, the DSL 104 (TR104) protocol adds the profiles related to Voice over Internet Protocol (VoIP), including endpoint, Session Initiation Protocol (SIP) endpoint, Media Gateway Control Protocol (MGCP) endpoint, H323 endpoint, and TA endpoint. Moreover, the protocol 111 (TR111) adds the data nodes for remote management on home network devices on the basis of the existing profiles.

The DSL Forum does not standardize the data management models of the mobile communication devices, for example, High-Speed Packet Access (HSPA), data card, fixed station, which makes it inconvenient for the TR069 ACS to manage the mobile communication devices uniformly and affects the replaceability of the mobile communication devices.

SUMMARY

The embodiments of the present invention provide a method, an apparatus and a system for managing mobile communication devices to implement unified management and replaceability of mobile communication devices and improve the capabilities of managing mobile communication devices.

A method for managing mobile communication devices in an embodiment of the present invention includes:
receiving a management instruction delivered by an ACS through a TR069 protocol;
converting the management instruction into a command identifiable to a mobile communication device, and sending the identifiable command to the mobile communication device;
receiving a response instruction sent by the mobile communication device after the mobile communication device executes the identifiable command; and
encapsulating the response instruction into a TR069 response message, and sending the message to the ACS.

An apparatus for managing mobile communication devices in an embodiment of the present invention includes:
a first receiving unit, configured to receive a management instruction delivered by an ACS through a TR069 protocol;
a processing unit, configured to: convert the management instruction into a command identifiable to a mobile communication device, and send the identifiable command to the mobile communication device;
a second receiving unit, configured to receive a response instruction sent by the mobile communication device after the mobile communication device executes the identifiable command; and
an encapsulating unit, configured to encapsulate the response instruction into a TR069 response message, and send the message to the ACS.

A system for managing mobile communication devices in an embodiment of the present invention includes: an ACS, a gateway and a mobile communication device.

The ACS includes:
a sending unit, configured to send a management instruction through a TR069 protocol; and
a message receiving unit, configured to receive a TR069 response message.

The gateway includes:
a processing unit, configured to: convert the received management instruction into a command identifiable to a mobile communication device, and send the identifiable command to the mobile communication device;
a receiving unit, configured to receive the management instruction delivered by ACS through the TR069 protocol and a response instruction sent by the mobile communication device after the mobile communication device executes the identifiable command; and
an encapsulating unit, configured to encapsulate the response instruction into a TR069 response message, and report the message to the message receiving unit of the ACS.

The mobile communication device includes:
an executing unit, configured to return a response instruction after receiving and executing the command identifiable to the mobile communication device.

Through the method, apparatus and system for managing mobile communication devices, a management instruction is converted into a command identifiable to the mobile communication device; the mobile communication device executes the relevant operations according to the instruction and implements the relevant services, thus implementing unified management for mobile communication devices and improving the capabilities of managing the mobile communication devices.

The technical solution under the present invention is hereinafter described in detail with reference to some accompanying drawings and exemplary embodiments.

DETAILED DESCRIPTION OF THE EMBODIMENTS

Figure 1:
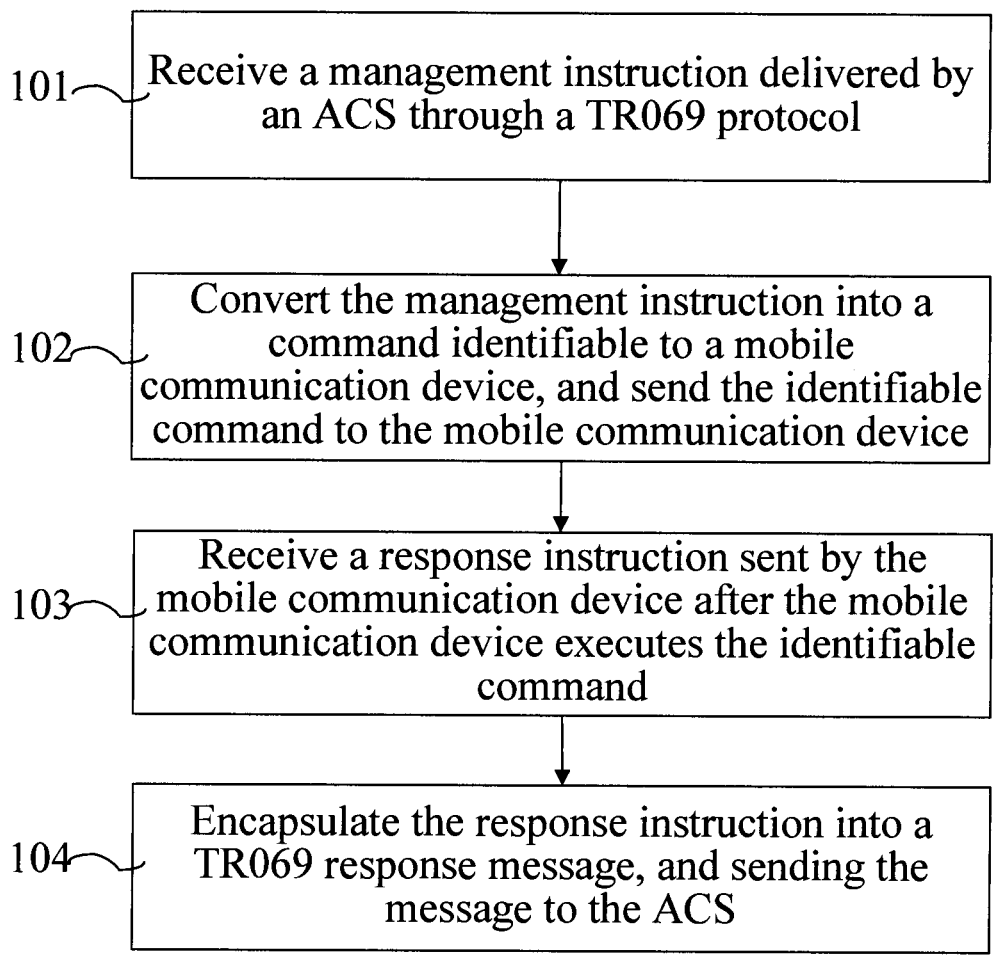
FIG. 1 is a flowchart of a method for managing mobile communication devices in an embodiment of the present invention.

As shown in FIG. 1, a method for managing mobile communication devices in an embodiment of the present invention includes the following steps:

Step 101: Receive a management instruction delivered by an ACS through a TR069 protocol.

The gateway receives the management instruction sent by the ACS through the TR069 protocol. Multiple configuration parameters are added in the protocol. As shown in Table 1, five types of configuration parameters are added. Through the first type of configuration parameters "InternetGatewayDevice.WANDevice.{i}.WANCommonInterfaceConfig.", the ACS can determine the Wide Area Network (WAN) access type of the mobile communication device. The WAN access types include not only the x Digital Subscriber Line (xDSL), Ethernet, Plain Old Telephone Service (POTS), but also include a MOBILE type "High-Speed Packet Access (HSPA)". The ACS can determine the WAN interface type used by the FMC device according to the first type of parameters. If the WAN interface type is the newly added "MOBILE" type, the mobile communication device parameters defined in Table 1 are valid, and further configuration actions can be taken for the "MOBILE" type. Through the second type of parameters "InternetGatewayDevice.WANDevice.{i}.WANHSPDAInterfaceConfig.", the ACS may set network registration parameters, including: Connection Order, which specifies the order of network search, makes the mobile communication device adaptable to the actual networking environment, and reduces the network search time; Band, which specifies the band selected by the mobile communication device for communicating with the basestation. The mobile communication device needs to register with the correct network before being able to perform wireless communication. First, the mobile communication device needs to search the network according to the value of "Connection Order", for example, search the GSM before searching the WCDMA, or search the WCDMA before searching the GSM. The networks for searching include: WiFi, WiMAX, TD-SCDMA, GSM, WCDMA, CDMA2000, and so on. A proper search order may be set according to the actual networking environment to reduce the time of network search. After searching out the wireless network, the mobile communication device needs to select the proper communication frequency to get adaptable to different communication conditions. Through the third type of parameters "InternetGatewayDevice.WANDevice.{i}.WANHSPDA InterfaceConfig.Stats.", the ACS can read the working state of the mobile communication device, including: VIB Available, indicating whether the mobile communication device is available, namely, whether the mobile communication device is physically connected with the gateway in a correct way, and based on the working state of the mobile communication device, the ACS determines whether the mobile communication device parameters are valid or determines to configure other parameters; VIB Data Working, indicating whether the mobile communication device is in the data stream forwarding state, and based on whether the mobile communication device is in the data stream forwarding state, the ACS judges whether the communication of the mobile communication device is normal; VIB Voice Working, indicating whether the mobile communication device is in the voice stream forwarding state, and based on whether the mobile communication device is in the voice stream forwarding state, the ACS judges whether the mobile communication device is in a voice conversation; Registered Connection Type, which records the connection types registered successfully, for example, GSM, WCDMA, TD-SCDMA, CDMA2000, WiFi, and WiMAX, where the ACS can query the successfully registered network types of the mobile communication device; Registered Band, indicating the channel frequency registered successfully and used by the mobile communication device, where the ACS can query the communication frequency being used by the mobile communication device, for example, GSM 850, and GSM 900; Registered Network, indicating the name of the network registered successfully and used by the mobile communication device, for example, "China Mobile"; and RSSI, indicating the strength of signals received by the mobile communication device, and based on the strength of signals received by the mobile communication device, the ACS can determine the signal quality of the mobile communication device. Through the fourth type of parameters "InternetGatewayDevice.WANDevice.{i}.WANHSPDAD eviceInfo.", the ACS can read the information about the mobile communication device, including: International Mobile Subscriber Identifier (IMSI), which records the customer information of the mobile communication device; International Mobile Station Equipment Identifier (IMEI), which records the identifier of the mobile communication device; Manufacturer, indicating the manufacturer of the mobile communication device; Hard Version, which records the hardware version of the mobile communication device; Soft Version, indicating the software version of the mobile communication device, and based on the information about the mobile communication device the ACS judges the hardware information of the mobile communication device, and this helps to further set parameters of the mobile communication device, or helps the customer solve specific application problems. Through the fifth type of parameters "InternetGatewayDevice.WANDevice.{i}.WANConnection Device.{i}.WANHSPDALinkConfig.", the ACS can set the data connection parameters of the mobile communication device, including: Profile Name, indicating the WAN connection configuration name of the mobile communication device; APN, indicating the domain name of the network access point for the mobile communication device to perform dial-up connection; Dial Number, indicating the number to be dialed for the mobile communication device to perform data connection dial-up; Username, indicating the username for authentication at the time of dial-up; Password, indicating the password for authentication at the time of dial-up connection; IP Address, indicating the IP address of the mobile communication device; Primary DNS, indicating the IP address of the primary Domain Name Server (DNS); Secondary DNS, indicating the IP address of the secondary DNS; and Authentication Protocol, indicating the algorithm for authenticating the identity. After registering with the network successfully, the mobile communication device becomes a legal physical-layer user of the network. Before data and voice communication, a data connection on the data link layer needs to be created. The mobile communication device dials the number specified by "Dial Number" to perform PPP dial-up connection, and provides the Username and the Password for the access server to authenticate the user. The authentication method is CHAP or PAP, which is specified by the Authentication Protocol. Additionally, the mobile communication device needs to set its IP Address, Primary DNS, and Secondary DNS.

TABLE 1

Parameter Configuration TABLE

| Name | Type | Write | Descript | Default |
|---|---|---|---|---|
| InternetGatewayDevice.WANDevice.{i}.WANCommonInterfaceConfig. | object | — | This object models WAN interface properties common across all connection instances. | — |
| WAN Access Type | string (16) | N | Specifies the WAN access (modem) type. Enumeration of: "DSL", "Ethernet", "POTS", "MOBILE" | "DSL" |
| InternetGatewayDevice.WANDevice.{i}.WANHSPDAInterfaceConfig. | object | — | This Object describes the property of HSPDA interface. | — |
| Connection Order | int | W | Network access sequence reference: 0 Automatic search, 1 GSM first, WCDMA later, 2 WCDMA first, GSM later, 3 No change | "1" |
| Band | int | W | The band of frequency relate to selection of mode, which is actually up to the performance of MS. The parameter is HEX string, whose value is as follows or with the exception of 0x3FFFFFFF and 0x40000000 parameter as combination: 00080000 (CM_BAND_PREF_GSM_850) GSM 850 00000080(CM_BAND_PREF_GSM_DCS_1800) GSM DCS systems 00000100(CM_BAND_PREF_GSM_EGSM_900) Extended GSM 900 00000200(CM_BAND_PREF_GSM_PGSM_900) Primary GSM 900 00100000(CM_BAND_PREF_GSM_RGSM_900) Railway GSM 900 00200000(CM_BAND_PREF_GSM_PCS_1900) GSM PCS 00400000(CM_BAND_PREF_WCDMA_I_IMT_2000) WCDMA IMT 2000 00800000 (CM_BAND_PREF_WCDMA_II_PCS_1900) WCDMA_II_PCS_1900 04000000 (CM_BAND_PREF_WCDMA_V_850) WCDMA_V_850 | <Empty> |
| InternetGatewayDevice.WANDevice.{i}.WANHSPDAInterfaceConfig.Status. | object | — | This object describes the state of HSPDA wan interface | — |
| VIB Available | boolean | N | boolean parameter. True if the HSPA module is plugged into the USB port, false otherwise. | <Empty> |
| VIB Data Working | boolean | W | boolean parameter. True if the HSPA module is currently used for sending data traffic, false otherwise. | <Empty> |
| VIB Voice Working | boolean | W | boolean parameter. True if the HSPA module is currently used for sending voice traffic, false otherwise. | <Empty> |
| Registed Connection Type | string | N | GSM or WCDMA. | <Empty> |
| Registed Band | int | N | The band of frequency relate to selection of mode, which is actually up to the performance of MS. The parameter is HEX string, whose value is as follows or with the exception of 0x3FFFFFFF and 0x40000000 parameter as combination: 00080000 (CM_BAND_PREF_GSM_850) GSM 850 0000008(CM_BAND_PREF_GSM_DCS_1800) GSM DCS systems 0000010(CM_BAND_PREF_GSM_EGSM_900) Extended GSM 900 0000020(CM_BAND_PREF_GSM_PGSM_900) Primary GSM 900 0010000(CM_BAND_PREF_GSM_RGSM_900) Railway GSM 900 00200000(CM_BAND_PREF_GSM_PCS_1900) GSM PCS 00400000 CM_BAND_PREF_WCDMA_I_IMT_2000) WCDMA IMT 2000 00800000 CM_BAND_PREF_WCDMA_II_PCS_1900) WCDMA_II_PCS_1900 04000000 (CM_BAND_PREF_WCDMA_V_850) WCDMA_V_850 | <Empty> |
| Registed Network | string (32) | N | the current operator information | "" |
| RSSI | int | N | Strength of the receiving signal. The values are defined as follows: 0 Equal to or less than −113 dBm 1 −111 dBm 2 . . . 30 −109 . . . −53 dBm 31 Equal to or higher than −51 dBm 99 Unknown or unmeasurable. | "0" |
| InternetGatewayDevice.WANDevice.{i}.WANHSPDADeviceInfo. | object | — | | |
| IMSI | string (16) | N | The IMSI value stored in the card is returned directly. The returned value is a string composed of decimal digits that range from 0 to 9. Its composition is as | "" |

TABLE 1-continued

Parameter Configuration TABLE

| Name | Type | Write | Descript | Default |
|---|---|---|---|---|
| | | | follows:<br>MCC (3 char)Country code<br>MNC (2 or 3 char)Network code,<br>GSM application MSIN<br>(other)Identifies the identity of the mobile subscriber | |
| IMEI | string (16) | N | IMEI value. | "" |
| Manufacturer | string (32) | N | Manufacturer information. | "" |
| Hard Version | string (32) | N | Hardware version number. It is a string composed of 31 characters at most. | <Empty> |
| Soft Version | string (32) | N | Software version number. It is a string composed of 31 characters at most. | <Empty> |
| InternetGatewayDevice.WANDevice.{i}.WANConnectionDevice.{i}.WANHSPDALinkConfig. | object | — | This object describes the parameters of HSPDA wan link | — |
| ProfileName | string (32) | W | | <Empty> |
| APN | string (32) | W | String value. It indicates the access point domain name of the connected GGSN or external network. | "" |
| Dial Number | string (32) | W | | "" |
| Username | string (32) | W | | "" |
| Password | string (32) | W | | "" |
| IP Address | string | W | | "" |
| Primary DNS | string | W | | "" |
| Secondary DNS | string | W | | "" |
| Authentication Protocol | string | W | CHAP/PAP | <Empty> |

Step 102: Convert the management instruction into a command identifiable to a mobile communication device, and send the identifiable command to the mobile communication device.

After receiving the management instruction, the gateway converts the management instruction into a command identifiable to the mobile communication device, and sends the identifiable command to the mobile communication device.

Step 103: Receive a response instruction sent by the mobile communication device after the mobile communication device executes the identifiable command.

After receiving the instruction that is sent by the gateway and identifiable to the mobile communication device, the mobile communication device interprets and executes the instruction, performs the relevant service operations, and sends a response instruction to the gateway.

Step 104: Encapsulate the response instruction into a TR069 response message, and send the message to the ACS.

After receiving the response instruction, the gateway encapsulates the response instruction into a TR069 response message, and sends the message to the ACS.

Through the method for managing mobile communication devices, a management instruction is converted into a command identifiable to the mobile communication device. The mobile communication device executes the relevant operations according to the instruction and implements the relevant services, thus implementing unified management for mobile communication devices and improving the capabilities of managing the mobile communication devices.

Through setting of five types of configuration parameters, the mobile communication device is incorporated into the TR069 uniform management platform, and the standardization of the management interface is improved.

Figure 2:
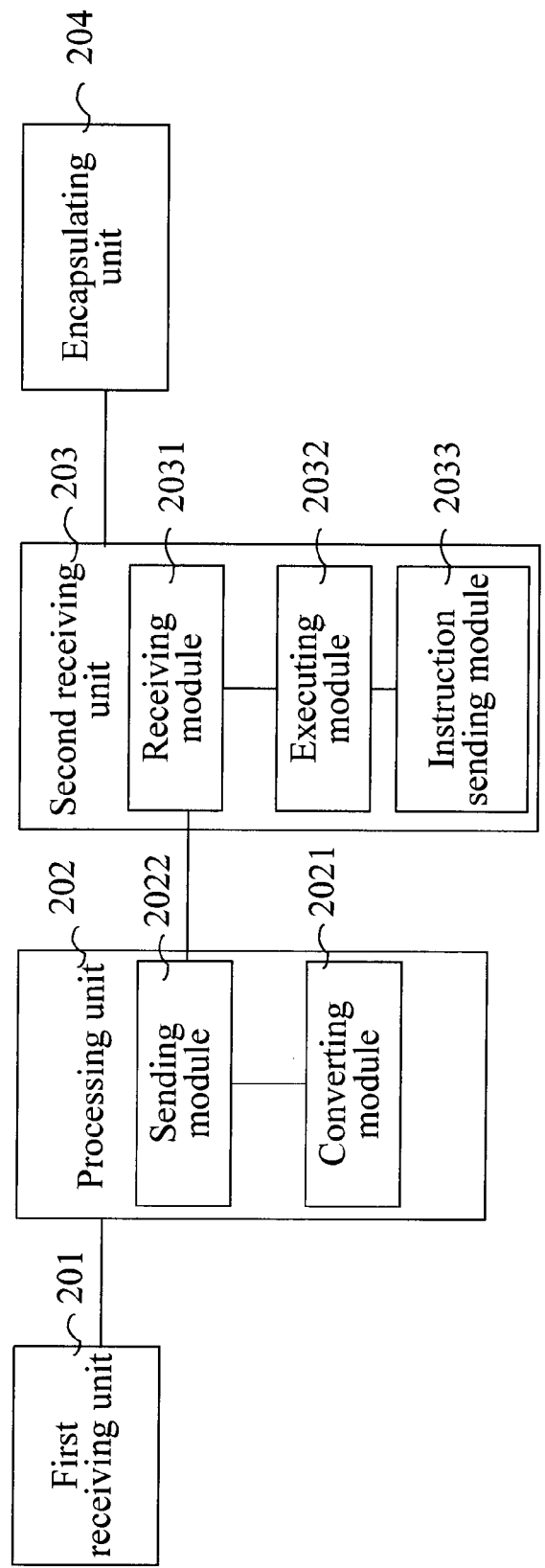
FIG. 2 shows a structure of a gateway for managing mobile communication devices in an embodiment of the present invention.

FIG. 2 shows a structure of a gateway for managing mobile communication devices in an embodiment of the present invention. The gateway includes:

a first receiving unit 201, configured to receive a management instruction delivered by an ACS through a TR069 protocol;

a processing unit 202, configured to: convert the management instruction into a command identifiable to a mobile communication device, and send the identifiable command to the mobile communication device;

a second receiving unit 203, configured to receive a response instruction sent by the mobile communication device after the mobile communication device executes the identifiable command; and an encapsulating unit 204, configured to encapsulate the response instruction into a TR069 response message, and send the message to the ACS.

The processing unit may include:

a converting module 2021, configured to convert the management instruction into a command identifiable to the mobile communication device; and a sending module 2022, configured to send the identifiable command to the mobile communication device through a control channel.

Multiple types of configuration parameters are set in the TR069 protocol. Five sets of configuration parameters are enumerated in this embodiment, as shown in Table 1.

Through the apparatus for managing mobile communication devices, the processing unit converts the management instruction into a command identifiable to the mobile communication device. The mobile communication device executes the relevant operations according to the instruction and implements the relevant services, thus implementing unified management for mobile communication devices and improving the capabilities of managing the mobile communication devices. Moreover, five types of configuration parameters are set so that the mobile communication device is incorporated into the TR069 uniform management platform and the standardization of the management interface is improved.

Figure 3:
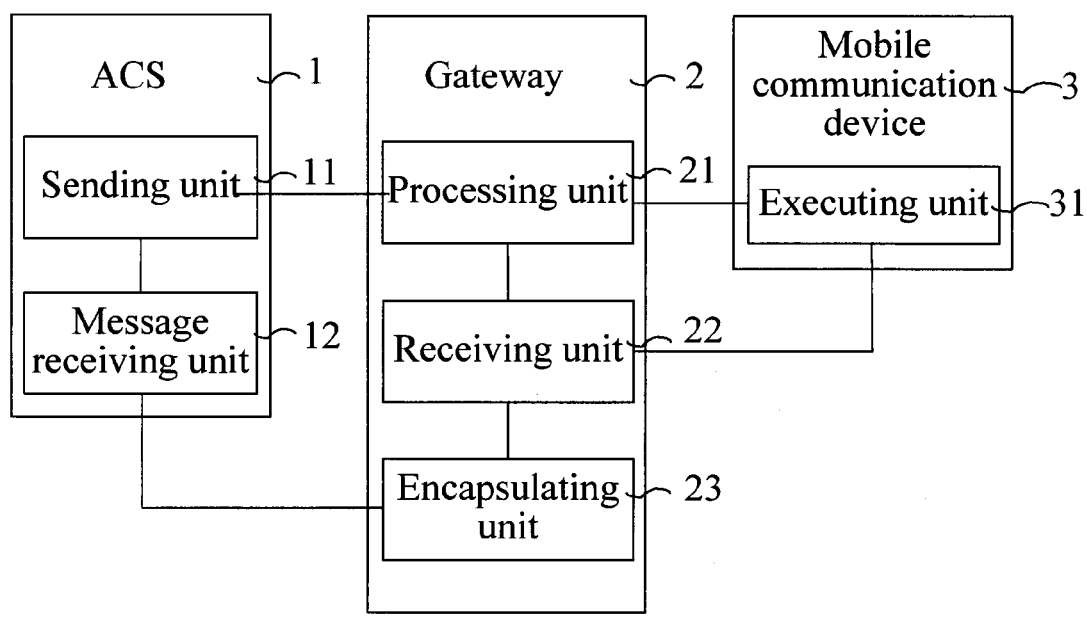
FIG. 3 shows a structure of a system for managing mobile communication devices in an embodiment of the present invention.

FIG. 3 shows a structure of a system for managing mobile communication devices in an embodiment of the present invention. The system includes: an ACS 1, a gateway 2, and a mobile communication device 3.

The server 1 includes:

a sending unit 11, configured to send a management instruction through a TR069 protocol; and a message receiving unit 12, configured to receive a TR069 response message.

The gateway 2 includes:

a processing unit 21, configured to: convert the received management instruction into a command identifiable to a mobile communication device, and send the identifiable command to the mobile communication device;

a receiving unit 22, configured to receive the management instruction delivered by ACS through the TR069 protocol and a response instruction sent by the mobile communication device after the mobile communication device executes the identifiable command; and an encapsulating unit 23, configured to encapsulate the response instruction into a TR069 response message, and report the message to the message receiving unit of the ACS.

The mobile communication device 3 includes:

an executing unit 31, configured to return a response instruction after receiving and executing the command identifiable to the mobile communication device.

As shown in FIG. 2, the processing unit may include:

a converting module 2021, configured to convert the management instruction into a command identifiable to the mobile communication device; and a sending module 2022, configured to send the identifiable command to the mobile communication device through a control channel.

The second receiving unit 203 includes:

a receiving module 2031, configured to receive the command identifiable to the mobile communication device;

an executing module 2032, configured to interpret and execute the identifiable command and perform service operations; and an instruction sending module 2033, configured to send a response instruction to the server.

Moreover, five types of configuration parameters are set, as shown in Table 1.

In the foregoing service processing system, the processing unit converts the management instruction into a command identifiable to the mobile communication device. The mobile communication device executes the relevant operations according to the instruction and implements the relevant services, thus implementing unified management for mobile communication devices and improving the service processing capabilities of the mobile communication devices. Moreover, five types of configuration parameters are set so that the mobile communication device is incorporated into the TR069 uniform management platform and the standardization of the management interface is improved.

It is understandable that the five types of configuration parameters added herein may have other names as long as their functions are fulfilled. The definition of the names of the configuration parameters herein does not restrict the protection scope of the present invention.

After reading the foregoing embodiments, those skilled in the art are clearly aware that the present invention may be implemented through hardware, or through software in addition to a necessary universal hardware platform. The technical solution under the present invention may be embodied as a software product. The software product may be stored in a non-volatile storage medium (such as CD-ROM, USB flash disk, or mobile hard disk), and may include several instructions that enable a computer device (such as personal computer, server, or network device) to perform the methods provided in the embodiments of the present invention.

Described above are merely preferred embodiments of the present invention, but not intended to limit the scope of the present invention. Any modification, equivalent replacement, and improvement made without departing from the principle of the present invention fall within the scope of the present invention.

What is claimed is:

1. A method for managing a mobile communication device implemented by a gateway comprising a processor, the method comprising:

receiving a parameter configuration management instruction delivered by an Automatic Configuration Server (ACS) through a TR069 protocol;

converting, by the processor, the parameter configuration management instruction into a command identifiable to the mobile communication device;

sending the identifiable command to the mobile communication device;

receiving a response instruction sent by the mobile communication device after the mobile communication device executes the identifiable command;

encapsulating the response instruction into a TR069 response message; and sending the TR069 response message to the ACS.

2. The method for managing a mobile communication device according to claim 1, wherein sending the identifiable command to the mobile communication device comprises sending a command to determine a manufacturer of the mobile communication device, a hardware version of the mobile communication device, and a software version of the mobile communication device.

3. The method for managing a mobile communication device according to claim 2, wherein the identifiable command instructs the mobile communication device to interpret the identifiable command, execute the identifiable command, and perform service operations.

4. The method for managing a mobile communication device according to claim 2, wherein the identifiable command is sent through a control channel.

5. The method for managing a mobile communication device according to claim 2, wherein the configuration parameters comprise TR069 protocol parameters in which multiple types of configuration parameters are added.

6. The method for managing a mobile communication device according to claim 5, wherein the multiple types of configuration parameters include a first type of configuration parameters, a second type of configuration parameters, a third type of configuration parameters, a fourth type of configuration parameters, and a fifth type of configuration parameters, wherein the first type of configuration parameters are associated with determining a wide area network access type, wherein the second type of configuration parameters are associated with setting network registration parameters, wherein the third type of configuration parameters are associated with reading a working state of the mobile communication device, wherein the fourth type of configuration parameters are associated with reading information about the manufacturer of the mobile communication device, the hardware version of the mobile communication device, and the software version of the mobile communication device, and wherein the fifth type of configuration parameters are associated with setting data connection parameters of the mobile communication device.

7. The method for managing a mobile communication device according to claim 2, wherein sending the identifiable command comprises sending a command to determine a wide area network access type of the mobile communication device.

8. The method for managing a mobile communication device according to claim 2, wherein sending the identifiable command comprises sending a command to set network registration parameters of the mobile communication device.

9. The method for managing a mobile communication device according to claim 2, wherein sending the identifiable command comprises sending a command to determine a working state of the mobile communication device.

10. The method for managing a mobile communication device according to claim 2, wherein the command further comprises instructions to determine an International Mobile Subscriber Identifier (IMSI) of the mobile communication device and an International Mobile Station Equipment Identifier (IMEI) of the mobile communication device.

11. The method for managing a mobile communication device according to claim 2, wherein sending the identifiable command comprises sending a command to set data connection parameters of the mobile communication device.

12. An apparatus for managing a mobile communication device comprising:
   a first receiving unit configured to receive a management instruction delivered by an Automatic Configuration Server (ACS) through a TR069 protocol;
   a processing unit configured to convert the management instruction into a command identifiable to the mobile communication device and send the identifiable command to the mobile communication device;
   a second receiving unit configured to receive a response instruction sent by the mobile communication device after the mobile communication device executes the identifiable command; and
   an encapsulating unit configured to encapsulate the response instruction into a TR069 response message and send the TR069 response message to the ACS.

13. The apparatus for managing a mobile communication device according to claim 12, wherein the identifiable command comprises a command to determine a manufacturer of the mobile communication device, a hardware version of the mobile communication device, and a software version of the mobile communication device.

14. The apparatus for managing a mobile communication device according to claim 13, wherein the processing unit comprises a converting module and a sending module, wherein the converting module is configured to convert the management instruction into the command identifiable to the mobile communication device, wherein the sending module is configured to send the identifiable command to the mobile communication device through a control channel, wherein the second receiving unit comprises a receiving module, an executing module, and an instruction sending module, wherein the receiving module is configured to receive the command identifiable to the mobile communication device, wherein the executing module is configured to interpret the identifiable command, execute the identifiable command, and perform service operations, and wherein the instruction sending module is configured to send the response instruction to a server.

15. The apparatus for managing a mobile communication device according to claim 13, wherein the second receiving unit comprises:
   a receiving module configured to receive the command identifiable to the mobile communication device;
   an executing module configured to interpret the identifiable command, execute the identifiable command, and perform service operations; and
   an instruction sending module configured to send the response instruction to a server.

16. The apparatus for managing a mobile communication device according to claim 13, wherein the identifiable command comprises a command that is configured to determine a wide area network access type of the mobile communication device.

17. The apparatus for managing a mobile communication device according to claim 13, wherein the identifiable command comprises a command that is configured to set network registration parameters of the mobile communication device.

18. A system for managing a mobile communication device comprising:
   an Automatic Configuration Server (ACS);
   a gateway; and
   a mobile communication device,
   wherein the ACS comprises a sending unit configured to send a management instruction through a TR069 protocol and a message receiving unit configured to receive a TR069 response message,
   wherein the gateway comprises a processing unit configured to convert the received management instruction into a command identifiable to the mobile communication device and send the identifiable command to the mobile communication device,
   wherein the gateway comprises a receiving unit configured to receive the management instruction delivered by the ACS through the TR069 protocol and a response instruction sent by the mobile communication device after the mobile communication device executes the identifiable command,
   wherein the gateway comprises an encapsulating unit configured to encapsulate the response instruction into the TR069 response message and report the TR069 response message to the message receiving unit of the ACS, and
   wherein the mobile communication device comprises an executing unit configured to return the response instruction after receiving and executing the identifiable command.

19. The system for managing a mobile communication device according to claim 18, wherein the command identifiable to the mobile communication device comprises a command to determine a manufacturer of the mobile communication device, a hardware version of the mobile communication device, and a software version of the mobile communication device.

20. The system for managing a mobile communication device according to claim 19, wherein the identifiable command comprises additional commands that are configured to determine a wide area network access type of the mobile communication device, set network registration parameters of the mobile communication device, and determine a working state of the mobile communication device.

* * * * *

UNITED STATES PATENT AND TRADEMARK OFFICE
CERTIFICATE OF CORRECTION

PATENT NO. : 8,588,194 B2
APPLICATION NO. : 12/832135
DATED : November 19, 2013
INVENTOR(S) : Shuhua Chen Page 1 of 1

It is certified that error appears in the above-identified patent and that said Letters Patent is hereby corrected as shown below:

Title Page 2, References Cited, under Other Publications, Column 2, Lines 5-8 the following cited art should read:

Husain, Syed, et al., "Remote Device Management of WiMAX Devices in Multi-Mode Multi-Access Environment", Broadband Multimedia Systems and Broadcasting, 2008 IEEE International Symposium, Mar. 31, 2008 - Apr. 2, 2008, 13 pgs.

Signed and Sealed this
Twenty-fifth Day of March, 2014

Michelle K. Lee
*Deputy Director of the United States Patent and Trademark Office*